Oct. 16, 1923.
W. J. HOSCEIT ET AL
1,470,980
DUMP CAR CONSTRUCTION
Filed Dec. 11, 1922    2 Sheets-Sheet 1
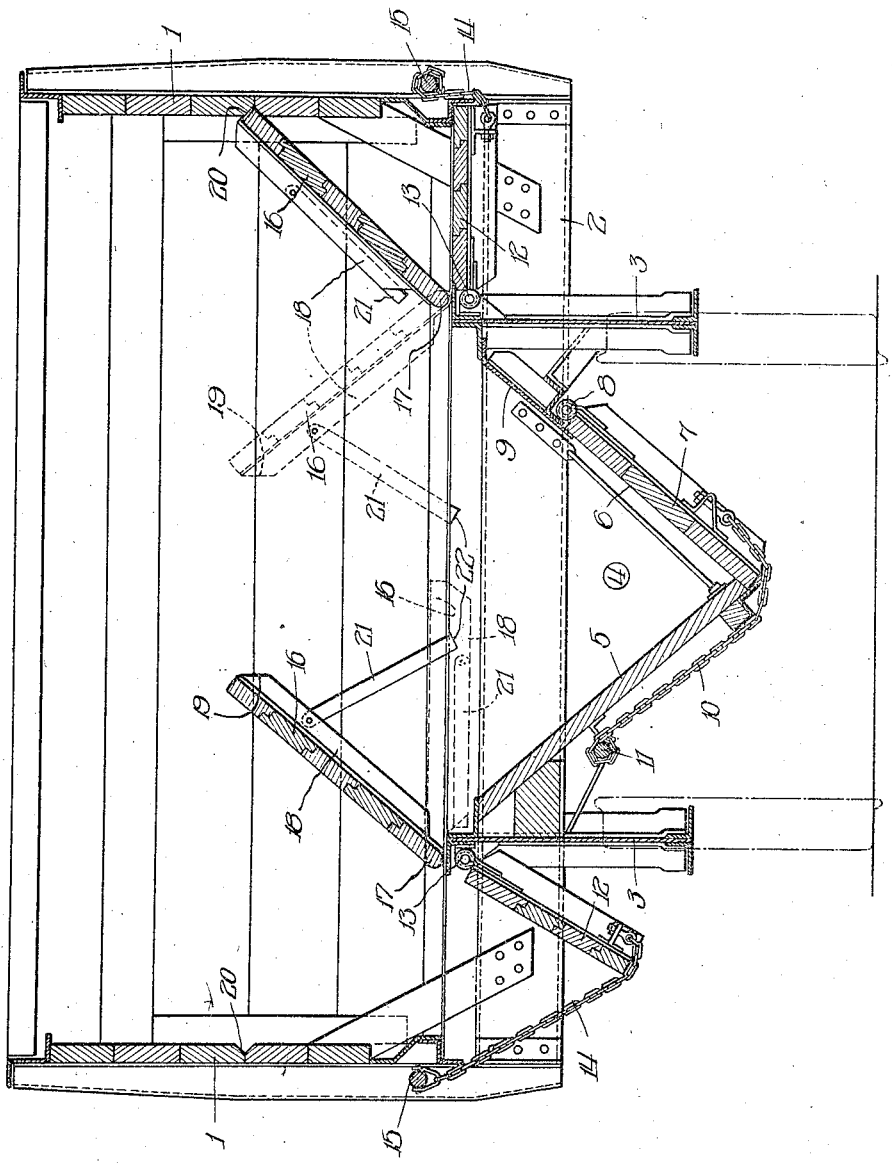
Witness:
R. Burkhardt.
Inventors:
William J. Hosceit,
David Hindahl,
By Wilkinson, Huxley, Byron & Knight
Attys Oct. 16, 1923.
W. J. HOSCEIT ET AL
1,470,980
DUMP CAR CONSTRUCTION
Filed Dec. 11, 1922
2 Sheets-Sheet 2
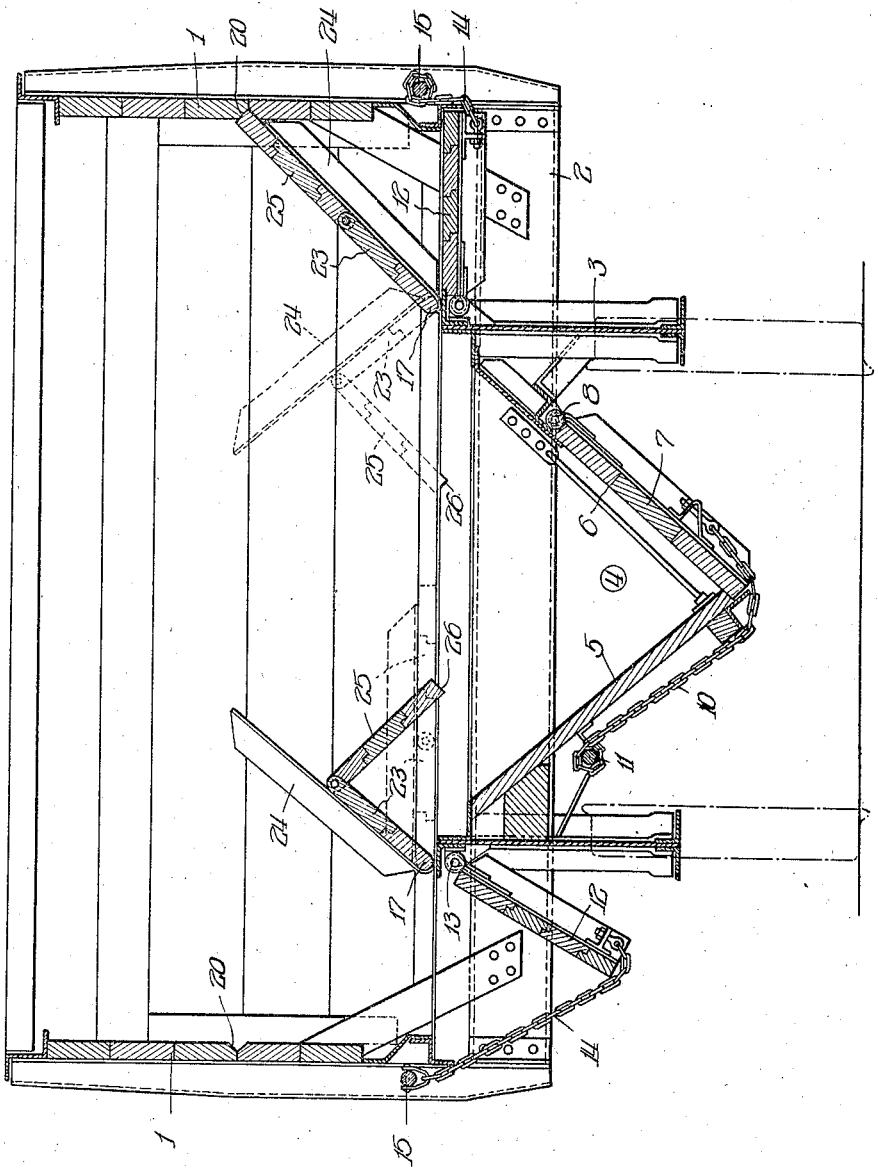
Witness
G. Burkhardt
Inventors:
William J Hosceit
David Hindahl,
By Wilkinson, Huxley, Byron & Knight
attys Patented Oct. 16, 1923.

1,470,980

UNITED STATES PATENT OFFICE.

WILLIAM J. HOSCEIT AND DAVID HINDAHL, OF CHICAGO, ILLINOIS, ASSIGNORS TO RODGER BALLAST CAR COMPANY, OF CHICAGO, ILLINOIS, A CORPORATION OF MAINE.

DUMP-CAR CONSTRUCTION.

Application filed December 11, 1922. Serial No. 606,042.

*To all whom it may concern:*

Be it known that we, WILLIAM J. HOSCEIT and DAVID HINDAHL, citizens of the United States, residing, respectively, at Chicago, in the county of Cook and State of Illinois, and at Chicago, in the county of Cook and State of Illinois, have jointly invented certain new and useful Improvements in Dump-Car Construction, of which the following is a specification.

The present invention relates to dump car construction.

An object of the present invention is to provide a dump car of sturdy construction which adapts itself for efficient operation as a flat bottomed car, a center dumping car, a side dumping car, or combined side and center dumping car.

A further object is to provide a dump car having bottom members of novel and sturdy construction adapted to perform the triple function of forming the flat bottom of a car, forming the sloping sides of a hopper for center dumping, and forming dividing means whereby the car may have both center and side dumping functions.

A further object is to provide a dump car having members forming a part thereof which are adapted to occupy a plurality of selective positions, said members being useful in said selective positions for forming a flat bottom, aiding in center dumping, side dumping, or combined side and center dumping functions.

A further object is to provide a sturdy dump car having members pivotally mounted therein, said pivotally mounted members being adapted to occupy a plurality of selective positions for center, side, or combined center and side dumping.

A further object is to provide a sturdy dump car which may be conveniently operated for center, side, or combined center and side dumping functions.

Further objects will appear as the description proceeds.

Referring to the drawings—

Figure 1 is a transverse sectional view of a dump car embodying the principles of the present invention; and Figure 2 is a view similar to Figure 1 but showing a slightly modified form.

The numerals 1—1 indicate the sides of a dump car, which sides may be supported by cross ties, one of which is indicated by the numeral 2. The numerals 3—3 indicate intermediate sills which form strengthening means for the car and supporting means for the cross ties 2—2. Said center sills according to the illustrated embodiments of the present invention also form means for pivotally mounting certain doors, which will be referred to particularly hereinafter.

Mounted centrally of the car at the bottom thereof is a hopper, which is indicated by the numeral 4, which hopper 4 has the two side walls 5 and 6. At least one of the side walls should be provided with a swinging door. In the present illustration the side wall 6 is provided with the swinging door 7, which may be pivoted at the axis 8 on the bracket 9, which is mounted upon one of the intermediate sills 3. A chain 10 may have one of its ends connected to the swinging door 7, its other end being connected to the operating shaft 11. Operation of shaft 11 controls the operation of the swinging door 7.

Placed outside of the intermediate sills 3—3 are the side doors 12—12, which are pivotally mounted about the axes 13—13, which intermediate sills 3—3, in the illustrated embodiments of the invention, provide pivotal mountings for said side doors 12—12. The side doors 12—12 may be controlled by means of the chains 14—14, which in turn are operated by the shafts 15—15. In the figures of the drawing, one of said doors is shown in closed position, while the other of said doors is shown in open position, which is the position for side dumping.

Referring particularly to Figure 1, doors 16—16 are pivotally mounted to swing about axes 17—17. The means for pivotally mounting said doors may be supported by the intermediate sills 3—3 at lines adjacent to the axes 13—13 about which the side doors 12—12 are mounted. Sides of the doors 16—16 may be provided with angles 18—18 for providing strength. The ends 19—19 of said angles may be beveled as shown in Figure 1 to permit the ready closing of the door 16—16. The side walls 1—1 may be notched, as indicated by the numerals 20—20, to receive the edges of the doors 16—16, whereby to eliminate any ledge that might otherwise be provided by the sides of said doors.

The doors 16—16 may be provided with hinged supports 21—21, said supports 21—21 being pivoted to said doors. Notches 22—22 may be provided in the frame of the car for holding the supports 21—21 in supporting position.

When it is desired to use the car illustrated in Figure 1 as a flat bottom car, the doors 16—16 will be swung away from the side walls 1—1 to a horizontal position. Said doors 16—16 will be of such length that they will meet in the middle. When it is desired to use the car as a hopper car for center dumping, the doors 16—16 will be swung to positions in proximity with the side walls 1—1. The door 16 at the right hand side of Figure 1 is arranged in the position referred to. When in said positions the doors 16—16 form converging walls directing dumpable material to the hopper 4. When it is desired to use the car as a combined center and side dumping car, said doors 16—16 will be moved to a position away from the side walls 1—1 into the diagonal positions illustrated in full lines in the left side of Figure 1 and in dotted lines in the right side of Figure 1. Supports 21—21 will engage notches 22—22 to hold the doors 16—16 in the position last referred to. When the doors 16—16 are in this last mentioned position, material dumped into the car will occupy the space within and above the hopper 4 and above the doors 12—12. The doors 16—16 will direct a part of the dumpable material toward the sides of the car, while the hopper will deliver dumpable material centrally of the car.

Referring to Figure 2, a slight modification is illustrated. In this embodiment of the invention, the doors forming the convertible floor are formed in two sections, a lower section 23 permanently secured to the angles 24 and an upper section 25 hinged to the section 23. The section 25 may, therefore, be swung into a position indicated at the right of Figure 2 in full lines, in which the two sections are in substantially the same plane, or the section 25 may be swung outwardly as indicated in full lines at the left of Figure 2, in which position the section 25 forms a brace supporting the section 23 in such a position as to divide the dumpable material so that a portion of it will flow to the side when the doors 12 are dropped and a portion of it through the hopper.

The operation of the embodiment illustrated in Figure 2 will be clear without detailed explanation. When the doors 23, 25—23, 25 are swung to occupy a horizontal position they will form a closed flat bottom for the car. Dumping may be accomplished through the side doors 12—12. When the doors 23, 25—23, 25 occupy the diagonal positions in proximity to the side walls 1—1, as illustrated in the right half of Figure 2, the parts are positioned for center dumping, said center dumping being accomplished through the hopper 4. When the doors 25—25 are mounted in supporting relation to their corresponding doors 23—23 as illustrated in full lines at the left of Figure 2 and in dotted lines at the right of Figure 2, the parts are positioned for both center and side dumping, the dumpable material passing through the side doors 12—12 and also through the hopper 4 centrally of the car.

The illustrated embodiments of the present invention have been chosen for the purpose of explaining the invention. Many modifications will occur to those skilled in the art. It is intended in this patent to cover all such modifications that fall within the scope of the invention as defined by the appended claims.

We claim:

1. Dump car construction, comprising center hopper means, side doors located laterally of said hopper means, said side doors having a substantially horizontal closed position and adapted to swing downwardly for dumping purposes, and supplementary doors pivoted along axes longitudinally of the car, said supplementary doors being adapted to occupy, selectively, horizontal positions for forming a substantially flat bottom, angular positions forming an open mouth for said hopper means and angular positions for directing dumpable material to said side doors.

2. Dump car construction, comprising centrally located hopper means, side doors located laterally of said hopper means, and supplementary doors adapted, selectively, to form continuations of the sides of said hopper means for center dumping or to occupy angular positions for directing dumpable material toward said side doors and permitting the passage of dumpable material to said hopper means.

3. In a dump car, the combination of centrally placed hopper means, side doors, pivoted supplementary doors, said supplementary doors including supporting means for holding same in a position intermediate of the range of swinging movement of said doors.

4. Dump car construction, comprising centrally placed hopper means, side doors located laterally thereof, and supplementary doors, said supplementary doors being provided with bracing means adapted to engage the sides of said car to hold said doors in positions to provide an open mouth converging toward said hopper means, said doors being provided with means for holding same in a position to direct dumpable material to said side doors while permitting dumpable material to pass to said hopper means.

5. Dump car construction, comprising centrally placed hopper means, side doors placed laterally of said hopper means, and swinging doors mounted above said hopper means, each of said swinging means having a range of movement from a horizontal position to an angular position forming an open mouth converging toward said hopper means, each of said doors being provided with means for holding same in a position intermediate of its range of travel.

Signed at Chicago, Illinois, this 24th day of November, 1922.

WILLIAM J. HOSCEIT.
DAVID HINDAHL.